INVENTOR.
LYMAN A. RICE
BY
His Attorney

United States Patent Office 2,807,869
Patented Oct. 1, 1957

2,807,869

METHOD OF WINDING A WIRE COIL

Lyman A. Rice, Anderson, Ind., assignor to General Motors Corporation, Detroit, Mich., a corporation of Delaware Application January 4, 1954, Serial No. 401,906

4 Claims. (Cl. 29—155.57)

This invention relates to coil windings and more particularly to a method for winding coils including a plurality of layers of wires carried by a sleeve wherein the ends of the wire windings are exposed at the exterior of said coil.

An object of the present invention is to provide a method for simultaneously winding a plurality of wire wrapped coils from separate supply sources each of which when wound has a plurality of layers of wire windings and has both ends of the wire used for the winding exposed to the exterior of said coils.

A more specific object of the present invention is to provide a method for simultaneously winding a plurality of wire wrapped coils each including a plurality of superimposed layers so that both ends of the wire used to wind each coil will be exposed at the exterior of the coil, this object is accomplished by providing a sleeve that has a plurality of pairs of axially extending spaced notches on one end thereof, each separated by portions of the sleeve forming said pairs of notches so a starting end of the wire to be wound on said sleeve may be hooked through said notches and under the portion therebetween whereby the wire when wound on the sleeve to form a coil having a plurality of layers of wire thereon, and will have both ends exposed to the exterior of the coil when an instrument is inserted into one of said notches from the interior of said sleeve to hook the starting end of the wire and pull it from beneath the layers of wire to the exterior of the coil.

Further objects and advantages of the present invention will be apparent from the following description reference being had to the accompanying drawings wherein a preferred embodiment of the present invention is clearly shown.

Figure 2:
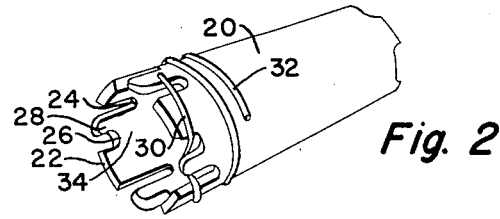
Figure 2 shows in perspective a starting end of a wire winding as hooked to a sleeve.
Figure 3:
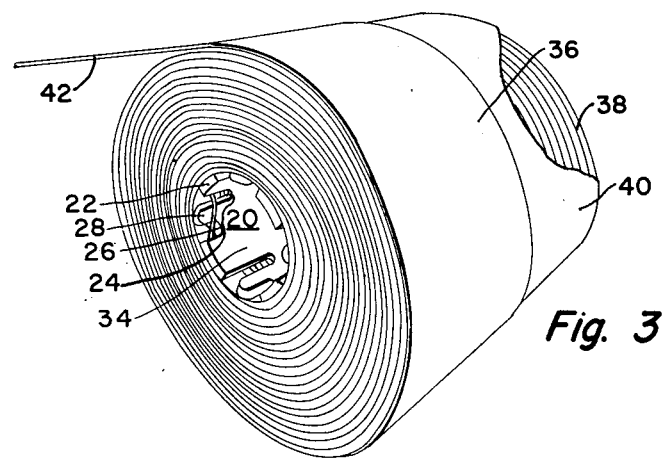
Figure 3 shows in perspective a wound coil of wire with one end of the wire winding exposed.
Figure 4:
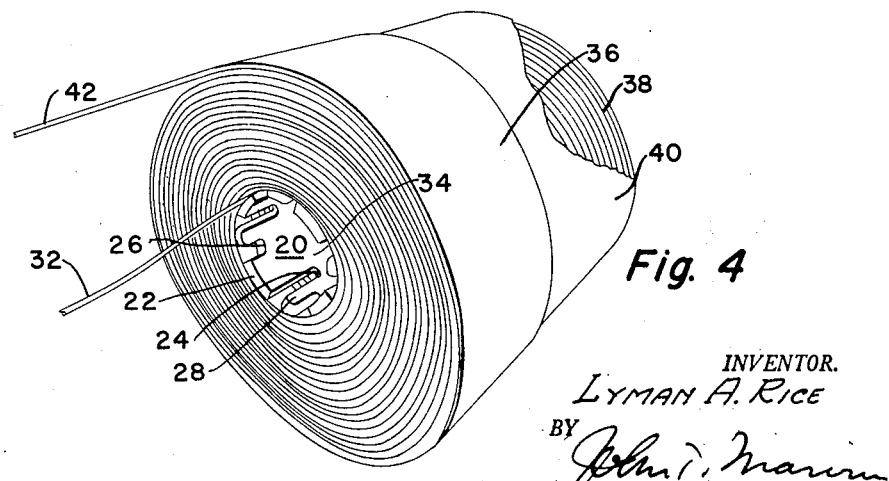
Figure 4 shows in perspective the coil in Figure 3 with both ends of the wire winding exposed.

In the drawings and in Figure 2 particularly, a sleeve 20, preferably made of insulating material, is shown as having a plurality of pairs of longitudinally extending spaced notches formed on an end 22. The pairs of notches preferably are formed of a shallow notch 26 and a notch 24 that longitudinally extends a further distance in the surface material of the sleeve 20. A portion 28 of sleeve material is located between the notches 24 and 26, so a portion of a starting end 30 of a wire 32 may be passed through notches 24 and 26 and beneath portion 28 and be thus held relative to the sleeve when the wire 32 is wound on the sleeve 20.

The sleeve 20 is particularly adapted for use with an automatic winding machine, not shown, whereby a plurality of wire wound coils may be simultaneously wound.

Figure 1:
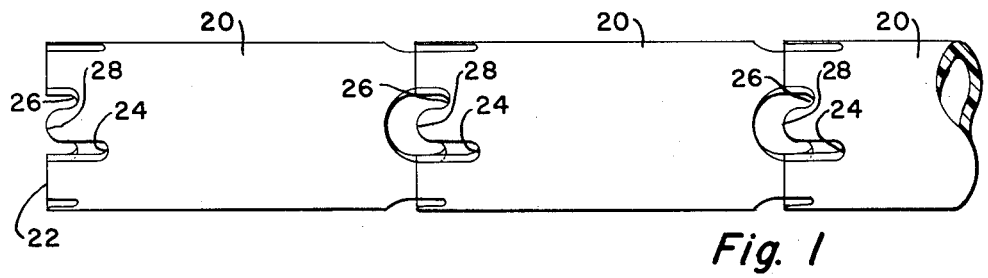
Figure 1 shows a plurality of sleeves axially aligned with each other.

This is accomplished by axially aligning a plurality of individual sleeves, as in Figure 1, on a mandrel, not shown, that passes through the interior 34 of the sleeves 20. The sleeves are then preferably rotated by the mandrel so that wire may be wound and guided thereon from a plurality of sources, not shown. The mandrel and wire wrapping devices are not shown as they are well known by those skilled in the art.

The coil 36 of wire 32 on sleeve 20 is preferably wound so that each layer of wire 38 is separated by a layer of insulating paper 40. This will result in a coil having a smoother surface than would be formed if the paper were not used and further, the paper will insulate one layer of wire from the other and thereby decrease the possibility of shorts if coated wire is used for the coil winding.

After the successive layers of coil winding and paper are applied to the sleeve 20, the end 42, may be secured to the coil by any suitable means, such as taping, gluing, etc., to provide a coil 36 of wire with one end 42 of wire exposed. The individual sleeve 20 with its wire coil winding 36 is then removed from the mandrel and a pointed instrument is inserted through the interior 34 of the sleeve 20 into the longer notch 24 so that the point of the instrument may be hooked behind the turns of wire adjacent the starting end 30 of the coil winding 36 and be used to pull the first three of four turns of winding axially over end 22 of the sleeve. The plurality of pairs of notches 24 and 26 that are spaced around the end to facilitate starting the coil and to permit the diameter of end 22 to be slightly radially reduced as the turns of wire are pulled from the end 22. Thus the starting end 30 of wire 32 will be exposed to the exterior of the coil winding 36 where it may be secured in a suitable manner, such as taping, etc.

From the above it is apparent that the method according to the present invention, will provide a coil of wire that has both terminal ends exposed. These coils may be used in a variety of applications, among these being in current relays, etc., wherein it is frequently desirable to have both ends of the wire forming the coil exposed. This invention does not comprehend the formation of a coil wherein only one end of a coil of wire is exposed or is the method concerned with the type of wire or sleeve used or whether or not insulating paper is positioned between each successive layer, as it is manifest that any type of wire, covered or uncovered, and any material may be used to provide a sleeve whereon the paper layers may be omitted or included.

While the embodiment of the present invention as herein disclosed, constitutes a preferred form, it is to be understood that other forms might be adopted.

What is claimed is as follows:

1. In a method of forming a coil winding on a sleeve, the steps comprising; providing a sleeve having a plurality of pairs of axially extending spaced notches on one end thereof wherein each of the notches forming said pair of notches has a portion of the material of said sleeve therebetween, hooking an end portion of the wire into one of said pairs of notches and under the portion of the sleeve material disposed between said pair of notches so that the portion of said wire passing beneath said portion is exposed to the interior of said sleeve, winding said wire from said end on said sleeve to form a coil of wire on said sleeve with the first turn thereof adjacent said notch covered by a plurality of layers of said wire, inserting an instrument into the interior of said sleeve and engaging said wire portion and axially pulling at least one turn of said winding from beneath said layers over the notched end of said sleeve for exposing said wire end to the exterior of said wire coil.

2. In a method of winding a conductor wire on a sleeve, the steps comprising; providing a sleeve having at least one pair of spaced notches on one end wherein the notches of each pair have an axial depth greater than the diameter of the wire to be wound on said sleeve, threading an end of said wire through one notch of a pair of notches then underneath a portion of the sleeve separating the two notches of said pair of notches and then through the other notch of said pair of notches to the outside surface of said sleeve, winding a plurality of turns of said wire on said sleeve for forming a plurality of layers of wire thereon and concealing said wire end beneath said layers, and finally exposing said end of the wire from beneath said layers by withdrawing the threaded end from said notches with an instrument that is inserted into one of said pair of notches while said notched end of said sleeve slightly radially collapses to permit the end of said wire to be withdrawn from beneath said layers.

3. In a method of winding a coil of wire on a sleeve, the steps comprising; providing a sleeve having at least one pair of spaced notches on one end wherein each notch has an axial depth greater than the diameter of said wire, hooking an end of the wire to be wound on said sleeve by passing said end of wire through one of said notches and through the other notch of said pair of notches so that the end and a portion of the wire to be wound is external to the sleeve, winding said wire from said end on said sleeve to form a coil of wire on said sleeve having the first turn thereof adjacent said notch covered by a plurality of layers of said wire, and inserting an instrument through one of said notches from the interior of said sleeve and engaging at least the first end turn of said wire winding and pulling said turn over the notched end of said sleeve for exposing said wire end to the exterior of said wire coil while said notched end of said sleeve slightly radially collapses to permit the end of said wire to be withdrawn from beneath said layers.

4. In a method of forming a coil winding on a sleeve, the steps comprising; providing a sleeve having a plurality of pairs of axially extending spaced notches on one end wherein each notch has a depth greater than the diameter of the wire to be wound on said sleeve, placing a portion of the wire adjacent an end of the wire in one of a pair of said notches and positioning said end portion thereof exterior to said sleeve by passing said end through the other notch of said pair of notches, winding said wire from said end on said sleeve to form a coil of wire on the sleeve having the first turn thereof adjacent said notch and the end thereof covered by a plurality of layers of wire, inserting an instrument through one notch of said pair of notches from the interior of said sleeve and engaging at least the end turn of said wire winding, and pulling said turn over the end of said sleeve while said notched end of said sleeve slightly radially collapses to permit the exposing of said wire to the interior of said coil.

References Cited in the file of this patent

UNITED STATES PATENTS

| 929,607 | Lawton | July 27, 1909 |
| 2,667,624 | Bels | Jan. 26, 1954 |